United States Patent
Raaf et al.

(10) Patent No.: US 7,062,288 B2
(45) Date of Patent: Jun. 13, 2006

(54) METHOD FOR CONTROLLING THE TRANSMISSION POWER IN A RADIO COMMUNICATION SYSTEM

(75) Inventors: Bernhard Raaf, Munich (DE); Christian Senninger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 435 days.

(21) Appl. No.: 10/362,245

(22) PCT Filed: Aug. 8, 2001

(86) PCT No.: PCT/DE01/03029

§ 371 (c)(1),
(2), (4) Date: Feb. 18, 2003

(87) PCT Pub. No.: WO02/15431

PCT Pub. Date: Feb. 21, 2002

(65) Prior Publication Data

US 2003/0186718 A1    Oct. 2, 2003

(30) Foreign Application Priority Data

Aug. 17, 2000 (DE) ................ 10040228.3

(51) Int. Cl.
*H04B 7/00* (2006.01)

(52) U.S. Cl. .................. 455/522; 455/69; 370/318

(58) Field of Classification Search ............. 455/67.11, 455/69, 522; 370/318, 320
See application file for complete search history.

(56) References Cited

U.S. PATENT DOCUMENTS 6,337,989 B1 * 1/2002 Agin .................... 455/522

FOREIGN PATENT DOCUMENTS

| DE | 198 21 519 | 11/1999 |
|----|------------|---------|
| EP | 0 926 842  | 6/1999  |
| WO | WO 00/22757 | 4/2000 |

OTHER PUBLICATIONS

3GPP TS 25.214 v5.0.0 (Mar. 2002).*
3rd Generation Partnership Project: Technical Specification Group Radio Access Network; Physical layer procedures (FDD), Release 1999, 3G TS 25.214 v3.3.0.*

(Continued)

*Primary Examiner*—Nay Maung
*Assistant Examiner*—Raymond S. Dean
(74) *Attorney, Agent, or Firm*—Bell, Boyd & Lloyd, LLC

(57) ABSTRACT

A method is provided for controlling the transmission power in a radio system, including the steps of: transmitting a transmission signal to a receiver; evaluating the transmission signal to produce a power control command for controlling the transmission power of the transmitter; setting the transmission power of the transmitter based on an estimated value after an occurrence of a transmission gap in a transmission channel, the estimated value taking account of power control commands produced for the transmitter in the past; and determining the estimated value as a function of a parameter which indicates whether the respective power control command is intended to be taken into account in the determination of the estimated value, and setting the parameter to a value which results in the power control command being taken into account when determining the estimated value.

5 Claims, 4 Drawing Sheets

OTHER PUBLICATIONS

3rd Generation Partnership Project; Technical Specification Group Radio Access Network; Physical layer procedures (FDD) (Release 1999).

A Fast Transmit Power Control Based on Markov Transition for DS-CDMA Mobile Radio written by Suda et al., published by NTT Mobile Communications Network Inc.

* cited by examiner

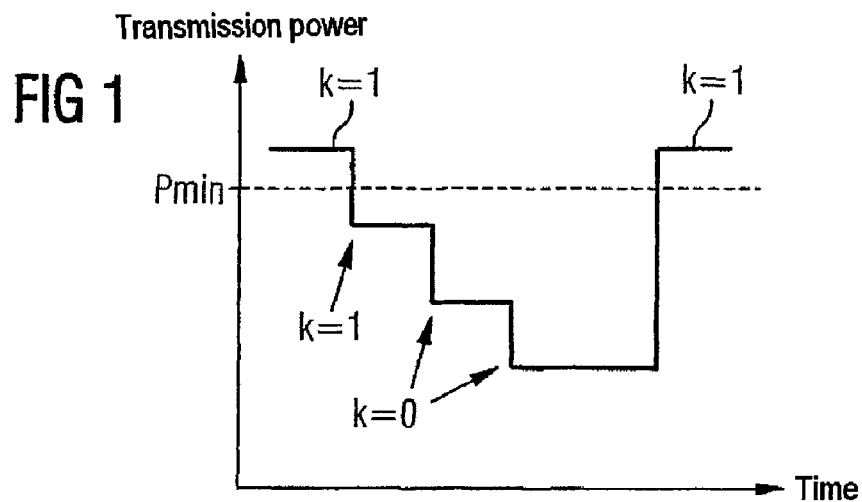
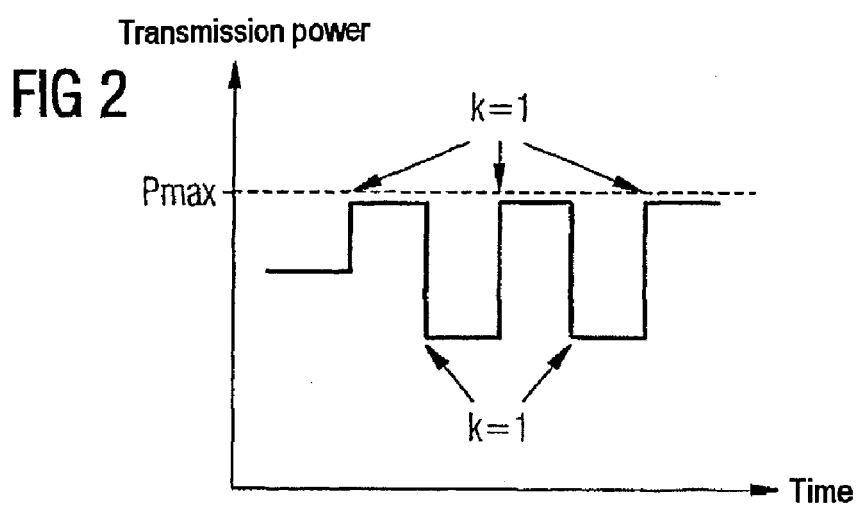
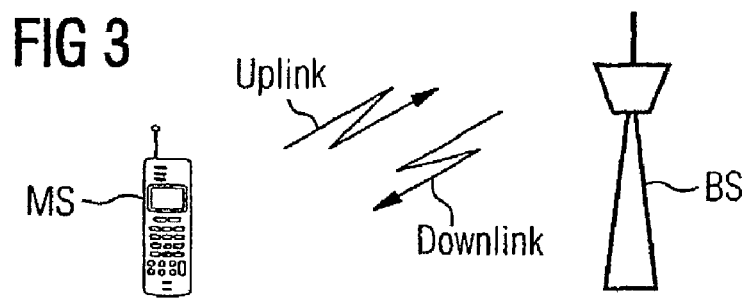

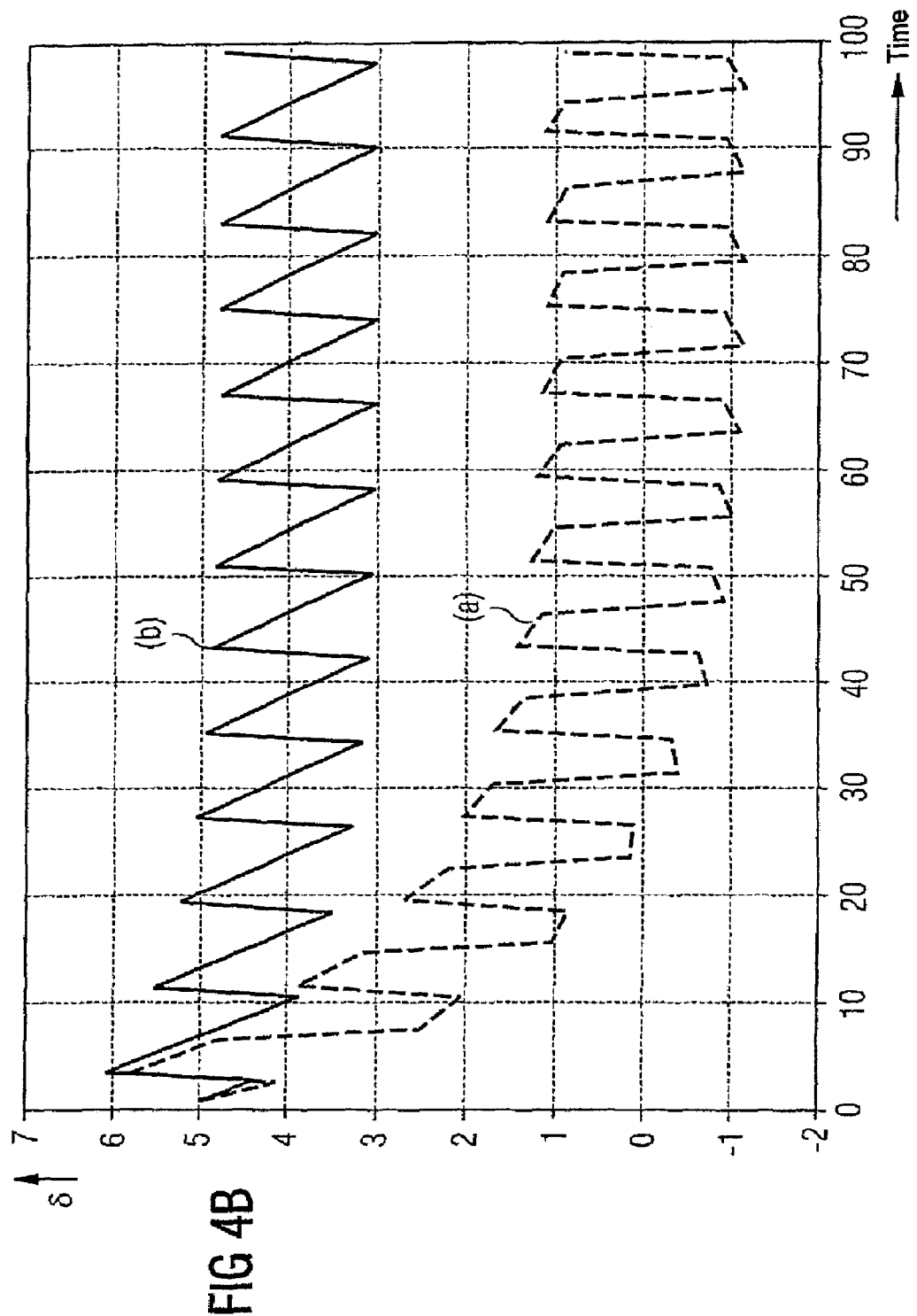

METHOD FOR CONTROLLING THE TRANSMISSION POWER IN A RADIO COMMUNICATION SYSTEM

BACKGROUND OF THE INVENTION

The present invention relates to a method for controlling the transmission power in a radio system; in particular, in a mobile radio system.

Continuous control is provided for the transmission power of the base stations and the mobile stations in mobile radio systems such as those according to the UMTS mobile radio standard ("Universal Mobile Telecommunication System"). In this case, the transmission power is controlled, in particular, in the form of a closed control loop (closed loop power control). For this purpose, a transmitter (for example, a mobile station), transmits a specific transmission signal (which is also referred to as a pilot signal) to the receiver (for example, a base station). The pilot signal in this case includes one or more pilot bits which are evaluated by the base station in order, as a function of it or them, to determine the signal-to-interference ratio (SIR) which is received on the respective transmission channel, and which is compared with a nominal value. The base station then transmits a power control command to the mobile station, whose aim is to increase or reduce the transmission power of the mobile station depending on the result of the comparison.

In order to illustrate this process, FIG. 3 shows the communication between a mobile station MS and a base station BS in a mobile radio system; for example, in a UMTS mobile radio system. In the following text, it is assumed that the aim is to control the transmission power of the mobile station MS. The mobile station MS transmits the already-described pilot signal via the transmission channel from the mobile station to the base station, which is referred to as the "uplink" transmission channel, and this pilot signal is evaluated by the base station BS. The base station BS then produces power control commands, which are transmitted to the mobile station MS via the transmission channel from the base station to the mobile station, which is referred to as the downlink transmission channel. Generally, these power control commands relate only to information instructing the mobile station (MS) to increase or to reduce its transmission power by a predetermined amount, or else to leave it unchanged. In principle, the power control command may include only one bit which, depending on its value, instructs the mobile station MS to increase or to reduce its transmission power by the abovementioned value.

The communication between the mobile station MS and the base station BS takes place in the form of a frame and time slot structure; in particular, with a new pilot signal being transmitted by the mobile station MS in each time slot. In a corresponding way, the base station BS transmits a new power control command in each time slot to the mobile station MS, with this power control command being based on the pilot signal transmitted during the preceding time slot.

A so-called compression mode is defined for the UMTS mobile radio standard, which envisages the information to be transmitted via the uplink and/or downlink transmission channel being transmitted in compressed form. This means that a compressed frame, transmitted in the compressed mode, includes one or more time slots in which no information is transmitted. These time slots form a transmission gap which can be used, inter alia, for adjacent channel observations, to prepare for handover processes, or the like.

When a transmission gap such as this occurs in the uplink and/or downlink channel, the base station BS does not receive the pilot signal (which is required to produce the power control commands) from the mobile station MS, or the mobile station MS does not receive the corresponding power control command from the base station BS. A transmission gap such as this in the uplink and/or downlink transmission channel thus interferes with the closed control loop which is used to control the transmission power of the mobile station MS, so that no power control commands can be transmitted during such a transmission gap.

The above description is also applicable, of course, to the control of the transmission power of the base station BS, although the present invention will be described in the following text—(without any restriction to generality) on the basis of the control of the transmission power of the mobile station MS.

In order to solve the transmission power control problem previously associated with the occurrence of a transmission gap, proposals have been made with regard to the UMTS mobile radio standard for an estimated value for the power control command to be expected in the future to be produced on the basis of the power control commands produced in the past, so that this estimated value can be used as the basis for controlling the transmission power after the occurrence of a transmission gap. In this case, the estimated value $\delta_i$, which describes the transmission power change to be expected after a transmission gap, can be determined, in particular, with the aid of the following recursive equations, with $TPC_i$ denoting the power control command received in the time slot No. i, and $\Delta TPC$ denoting the step width which is available for adjusting the transmission power. $\delta_{i-1}$ denotes the estimated value determined for the preceding time slot i−1:

$$\delta_i = 0.9375 \cdot \delta_{i-1} - 0.96875 \cdot TPC_i \cdot \Delta TPC \quad (1)$$

$$\delta_{i-1} = \delta_i \quad (2)$$

When controlling the transmission power of a mobile station (see FIG. 3), the estimated value $\delta_i$ is intended to be recalculated continuously by the mobile station MS in all the time slots in which both an uplink pilot signal and a downlink power control command are transmitted. Furthermore, the estimated value $\delta_i$ is also calculated in the first time slot of an uplink transmission gap if a downlink power control command has been transmitted in the corresponding time slot. The value $\delta_{i-1}$ is set to 0 whenever the control channel associated with the uplink channel of the mobile station MS is initiated or activated. Furthermore, $\delta_{i-1}$ is reset to 0 at the end of the first time slot after each uplink transmission gap and at the end of the first time slot after each downlink transmission gap. The estimated value for $\delta_i$ is, in each case, set to 0 at the end of the first time slot after each uplink transmission gap.

However, one problem that is associated with the above formulae and with the procedure described above occurs when the transmission power emitted by the mobile station MS is close to a predetermined maximum transmission power Pmax or to a minimum transmission power Pmin. Proposals have been made for UMTS mobile radio systems to carry out a scaling process in the vicinity of such transmission power limit values, in order to prevent the predetermined minimum transmission power Pmin being significantly undershot, and/or the predetermined maximum transmission power Pmax being significantly exceeded. This scaling process results in the above formula (1) being replaced by the following formula:

$$\delta_i = 0.9375 \cdot \delta_{i-1} - 0.96875 \cdot TPC_i \cdot \Delta TPC \cdot k \quad (3)$$

In this case, k denotes a parameter which assumes the value "0" when scaling is intended to be carried out, while the parameter k has the value "1" when no scaling is intended to be applied and the transmission power is intended to be determined in the normal manner.

The parameter k is conventionally set to k=0 whenever the transmission power emitted by the mobile station MS on the basis of previous power control commands would exceed the predetermined maximum transmission power Pmax or would be less than the predetermined minimum transmission power Pmin. In other situations, k=1 is used.

The scaling process to be carried out by the mobile station MS can be chosen such that power control commands which cause a further reduction in the transmission power of the mobile station are, in principle, multiplied by a specific factor, such as ¼, and are attenuated in the vicinity of the minimum transmission power Pmin, while power control commands which cause an increase in the transmission power are used without scaling.

FIG. 5A shows a corresponding profile of the transmission power. As can be seen from FIG. 5A, the mobile station MS is already close to the minimum transmission power limit Pmin. The mobile station then receives a power control command which reduces the transmission power, and which would result in the minimum transmission power limit Pmin being undershot. The mobile station MS applies the previously mentioned scaling process and multiplies each subsequent power control command which would cause a reduction in the transmission power by the factor ¼, so that these power control commands are attenuated. Since the scaling process is used for these power control commands, the parameter k has the value k=0. At the end of the transmission power profile shown in FIG. 5A, the mobile station MS receives a power control command which causes the transmission power to be increased. This power control command is implemented without any scaling, so that the parameter k=1 is used for this power control command. If the transmission power profile explained above is considered from the point of view of the already-described δ formula, then those power control commands which would lead to a transmission power below the minimum transmission power limit Pmin would not be included in the tendency of the power control commands in the δ formula by setting the parameter k to "0", while power control commands which result in a sudden change in the transmission power upward and beyond the minimum transmission power limit Pmin would be included in the estimated value δ. If the transmission power profile shown in FIG. 5A were repeated precisely in this manner several times successively, then a considerable increase in the transmission power would be taken into account as the tendency of the transmission power commands in the δ formula, although this does not correspond to reality.

When using the already-described scaling method, the mobile station MS is free to choose whether it will or will not allow the minimum transmission power limit Pmin to be undershot. If the mobile station MS is not intended to support undershooting of the minimum transmission power limit Pmin, then this can result in a transmission power profile as shown in FIG. 5B when the conventional scaling method is used. In principle, in the example shown in FIG. 5B, the scaling process is activated on reaching the minimum transmission power limit Pmin in such a way that transmission takes place with the value of the minimum transmission power limit Pmin. The parameter is set to k=0 once again on reaching the minimum transmission power limit Pmin. Otherwise, the principle already explained with reference to FIG. 5A still applies.

A similar problem also can occur at the maximum transmission power limit Pmax, in which case the scaling process may be chosen, for example, such that, when a power control command occurs which would lead to the maximum transmission power limit Pmax being exceeded, this power control command is reduced such that the transmission is carried out only at the magnitude of the maximum transmission power Pmax. When a power control command occurs which would lead to undershooting of the maximum transmission power limit, no scaling is used, in contrast.

FIG. 5C shows a corresponding transmission power profile. As can be seen from FIG. 5C, a power control command which would lead to the maximum transmission power limit Pmax being exceeded is subjected to the scaling process; that is to say, the parameter k is set to k=0, and the power control command is reduced such that transmission is carried out only at the value of the maximum transmission power Pmax. If, on the other hand, a power control command occurs which reduces the transmission power of the mobile station MS, no scaling is used (k=1) and this power control command is fully implemented, so that the maximum transmission power limit is considerably undershot.

Analogously to the examples illustrated in terms of the minimum transmission power limit Pmin in FIGS. 5A and 5B, the problem also occurs in the case of the example illustrated with regard to the maximum transmission power limit Pmax in FIG. 5C that, if repeated a number of times, would result in a power control response as a tendency which does not correspond to reality. In particular, in the example shown in FIG. 5C, a reduction in the transmission power which does not correspond to reality would be taken into account as the tendency of the power control commands.

The present invention is, therefore, directed toward an improved method for controlling the transmission power in a radio system, in particular a mobile radio system, wherein the problems mentioned above can be avoided and exact and realistic control of the transmission power is possible even in the area of the transmission power limits.

SUMMARY OF THE INVENTION

In contrast to the prior art as described above with reference to FIG. 5, the present invention proposes that the parameter k be set to k=1 for power control commands which would lead to the maximum transmission power limit being exceeded or reached, or which would lead to the minimum transmission power limit being undershot or reached. If the already-described method for estimating the power control value after the occurrence of the transmission gap were used, this would mean that power control commands which would lead to the maximum transmission power limit being exceeded or reached or which would lead to the minimum transmission power limit being undershot or reached would be taken into account in the δ formula (3) mentioned initially, since the parameter is set to the value k=1 for these power control commands. As will be explained in even more detail in the following text, use of this method in conjunction with the application of a scaling method to the transmission power limits makes it possible to avoid an undesirable or unintentional reduction in the estimated value $\delta_i$ at the minimum transmission power limit, and an unintentional increase in the estimated value $\delta_i$ at the maximum transmission power limit; that is to say, avoiding an unrealistic estimate of the previous transmission power control response.

The present invention is particularly suitable for UMTS mobile radio systems, where an estimated value is determined for the transmission power control after a transmission gap has occurred. However, in principle, the present invention can be used with any desired radio systems in which scaling methods are used in the region of the transmission power limits.

Additional features and advantages of the present invention are described in, and will be apparent from, the following Detailed Description of the Invention and the Figures.

BRIEF DESCRIPTION OF THE FIGURES

FIG. 1 and FIG. 2 show examples of transmission power profiles to assist in explaining the present invention.

FIG. 3 shows an illustration to explain the communication between a mobile station and a base station in a mobile radio system.

FIGS. 4A and 4B show signal profiles of $\delta_i$ in order to explain the advantages of the present invention.

DETAILED DESCRIPTION OF THE INVENTION

Figure 4A:
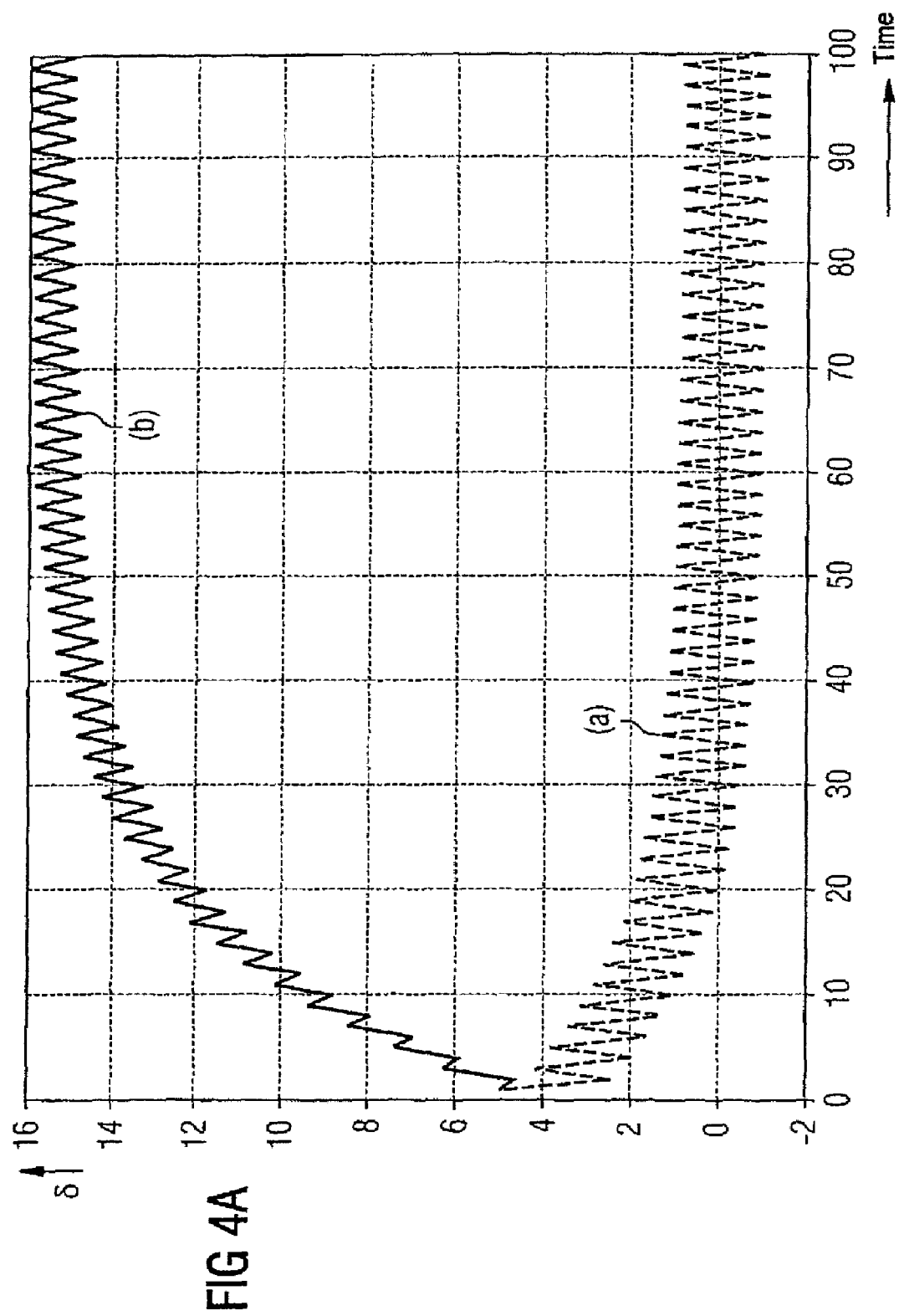

FIG. 1 shows a transmission power profile based on a scaling method according to the present invention, in which the transmission power profile shown in FIG. 1 corresponds to the transmission power profile shown in FIG. 5A. Analogously to FIG. 5A, the mobile station MS whose transmission power is to be controlled is already close to the minimum transmission power limit Pmin. The mobile station MS receives a power control command which would result in the minimum transmission power limit Pmin being undershot. In contrast to FIG. 5A, the parameter k is set to k=1 for this power control command according to FIG. 1, so that the power control command is taken into account on the basis of the already-described $\delta$ formula (3) for calculating the estimated value $\delta_i$ for the transmission power control, which can be used to set the transmission power after the occurrence of a transmission gap between the mobile station MS and the base station BS. Otherwise, the transmission power is scaled and controlled as already described with reference to FIG. 5A. That is, the subsequent power control commands which cause a further reduction in the transmission power are multiplied, for example, by the factor ¼, and are thus attenuated, with these commands not being taken into account in the formula (3) since k=0. If the mobile station MS receives a power control command which causes an increase in the transmission power, no scaling is (in principle) carried out and k is set to k=1, so that these power control commands are once again taken into account in the $\delta$ formula (3) for calculating the estimated value $\delta_i$.

According to the present invention, a power control command which would lead to this transmission power limit Pmax being exceeded or reached also is taken into account in the $\delta$ formula (3) and k is set to be k=1 at the upper transmission power limit Pmax. This will be explained in the following text using, by way of example, the transmission profile shown in FIG. 2, which corresponds to the transmission profile shown in FIG. 5C. As can be seen from FIG. 2, and in contrast to the example shown in FIG. 5C, the parameter k is set to k=1 for each power control command which would lead to the upper transmission power limit Pmax being exceeded or reached, so that the corresponding power control command is included in the calculation of the estimated value $\delta_i$ in accordance with the already-described formula (3). Otherwise, the transmission power control estimated value $\delta_i$ is calculated as described before on the basis of FIG. 5C, and k is likewise set to k=1 for power control commands which cause a reduction in the transmission power.

A transmission power profile which corresponds to the profile shown in FIG. 2 also may be obtained, of course, analogously to FIG. 5B by limiting to the minimum transmission power limit value Pmin, with k being set to k=1 for power control commands which would lead to Pmin being reached or undershot.

Thus, overall, the present invention proposes that power control commands which would lead to the maximum transmission power Pmax being exceeded or reached or which would lead to the minimum transmission power Pmin being undershot or reached, be taken into account in the above $\delta$ formula (3) by setting the parameter appropriately to k=1 for these power control commands.

The effect of the present invention will be explained in more detail in the following text with reference to the signal profiles shown in FIGS. 4A and 4B, in which the estimated value $\delta$ calculated in accordance with the $\delta$ formula (3) is respectively plotted against time and against the number of time slots. The characteristic (a) in each case denotes the profile for the estimated value $\delta$ which occurs when using the method according to the present invention, while the characteristic (b) denotes the profile of the estimated value $\delta$ which occurs when using the conventional method (see FIG. 5). The response of the $\delta$ formula (3) has, in each case, been considered for the situation of an infinitely continuous transmission power profile as shown in the illustrations in FIG. 2 and FIG. 5C, respectively, with $\delta$ being preset to 5 dBm at the start and $\Delta TPC=2$ dB.

In a corresponding manner to the method according to the present invention, power control commands are also included in the above $\delta$ formula (3) and in the calculation of the transmission power value $\delta$ which would lead to the upper transmission power limit Pmax being exceeded or reached. In the illustration shown in FIG. 4B, the maximum transmission power limit value Pmax is either reached or is left once again in every fourth time slot. As can be seen from FIG. 4B, the error or the discrepancy between the characteristic (b) and the characteristic (a) according to the present invention is approximately 4 dB.

However, should the frequency at which the maximum transmission power limit Pmax is reached or left increase, this would result in a greater error for the characteristic (b), as is evident from the illustration in FIG. 4A.

Figure 5:
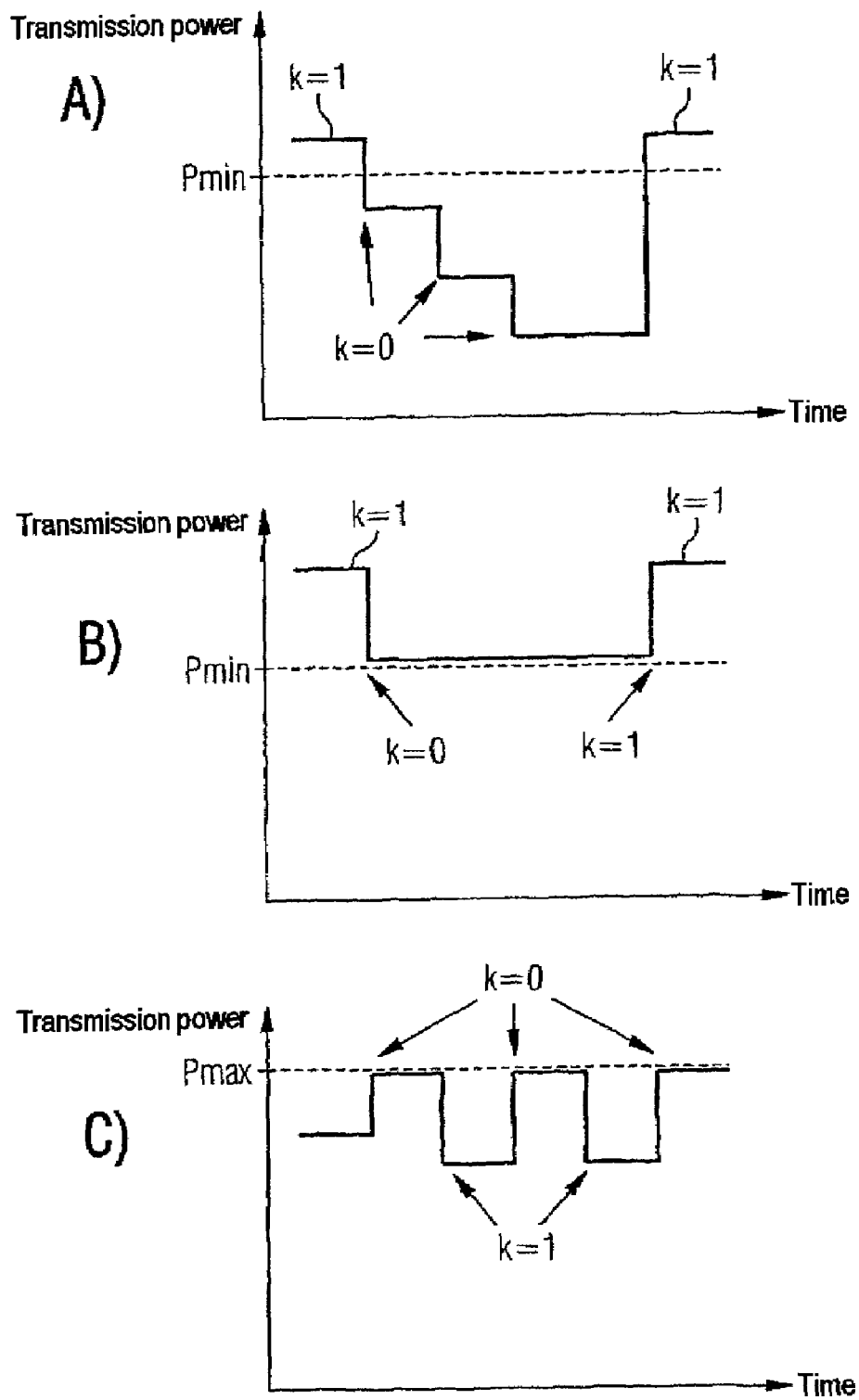
FIGS. 5A–C show examples of transmission power profiles according to the prior art.

The problems already explained with reference to FIG. 5 and which are associated with the formula (3) alternatively could be solved, for example, by modifying the $\delta$ formula (3) as follows:

$$\delta_i = 0.9375 \cdot \delta_{i-1} - (0.9675 \cdot TPC_i \cdot \Delta TPC)_{carried\ out} \qquad (4)$$

As such, the transmission power change actually carried out is used for the $\delta$ formula, rather than the commanded transmission power change.

Although the present invention has been described with reference to specific embodiments, those of skill in the art will recognize that changes may be made thereto without departing from the spirit and scope of the present invention as set forth in the hereafter appended claims.

The invention claimed is:

1. A method for controlling transmission power in a radio system, the method comprising the steps of:
   transmitting a transmission signal via a transmitter to a receiver;
   evaluating the transmission signal via the receiver to produce a power control command for controlling the transmission power of the transmitter and to transmit the power control command to the transmitter;
   setting the transmission power of the transmitter based on an estimated value ($\delta$) after an occurrence of a transmission gap in a transmission channel which is defined between the transmitter and the receiver, the estimated value taking account of power control commands produced for the transmitter prior to the occurrence of the transmission gap; and
   determining the estimated value as a function of a parameter which indicates whether the respective power control command is intended to be taken into account in the determination of the estimated value ($\delta$), and setting the parameter, for a power control command which would result in the transmission power of the transmitter one of reaching, exceeding and falling below a predetermined limit value, to a value which results in the power control command being taken into account when determining the estimated value ($\delta$).

2. A method for controlling transmission power in a radio system as claimed in claim 1, wherein an estimated value $\delta_i$ at time i is calculated using a recursive formula as follows:

$$\delta_i = 0.9375 \cdot \delta_{i-1} - 0.96875 \cdot TPC_i \cdot \Delta TPC k$$

where $\delta_{i-1}$ denotes a power estimated value at the time i−1, $TPC_i$ denotes the power control command received by the transmitter at the time i, $\Delta TPC$ denotes a step width using which the transmission power of the transmitter is set, and k denotes the parameter, and wherein the parameter k is set to k=1 for a power control command which would result in the transmission power of the transmitter one of reaching, exceeding and falling below the predetermined limit value.

3. A method for controlling transmission power in a radio system as claimed in claim 1, wherein the radio system is a UMTS mobile radio system.

4. A method for controlling transmission power in a radio system as claimed in claim 1, wherein the estimated value ($\delta$) is a power control estimated value, with the transmission power control for the transmitter being set based on the power control estimated value after the occurrence of a transmission gap.

5. A transmitting apparatus for a radio system, comprising:
   parts for receiving power control commands transmitted from another transmitting apparatus in the radio system, and for using the power control commands to control transmission power of the transmitting apparatus; and
   parts for readjusting the transmission power control based on an estimated value ($\delta$) after an occurrence of a transmission gap in a transmission channel which is defined between the transmitter and the another transmitting apparatus, the estimated value ($\delta$) taking account of power control commands produced for the transmitter prior to the occurrence of the transmission gap, with the estimated value ($\delta$) being determined in the transmitter as a function of a parameter which indicates for each transmission power control whether a corresponding power control command should be taken into account when determining the estimated value ($\delta$).

* * * * *